United States Patent
Okuno

(10) Patent No.: US 10,920,828 B2
(45) Date of Patent: Feb. 16, 2021

(54) TONER TRANSPORTING DEVICE, DEVELOPING DEVICE, AND IMAGE FORMING APPARATUS

(71) Applicant: FUJI XEROX CO., LTD., Tokyo (JP)

(72) Inventor: Taichiro Okuno, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/274,801

(22) Filed: Feb. 13, 2019

(65) Prior Publication Data

US 2020/0096046 A1 Mar. 26, 2020

(30) Foreign Application Priority Data

Sep. 20, 2018 (JP) .................................. 2018-176505

(51) Int. Cl.
  *F16C 33/58* (2006.01)
  *G03G 15/08* (2006.01)
  *F16C 13/02* (2006.01)
  *F16C 19/06* (2006.01)

(52) U.S. Cl.
  CPC ............ *F16C 33/586* (2013.01); *F16C 13/02* (2013.01); *F16C 19/06* (2013.01); *G03G 15/0812* (2013.01); *G03G 15/0815* (2013.01); *G03G 15/0822* (2013.01); *F16C 2324/16* (2013.01)

(58) Field of Classification Search
  CPC .......... F16C 19/02; F16C 19/06; F16C 33/58; F16C 33/586; F16C 2324/00; F16C 2324/16
  See application file for complete search history.

(56) References Cited

U.S. PATENT DOCUMENTS

| | | | | |
|---|---|---|---|---|
| 4,909,640 A | * | 3/1990 | Nakanishi | F16C 13/006 384/505 |
| 8,913,940 B2 | * | 12/2014 | Sawamura | G03G 15/2003 399/122 |
| 2004/0190929 A1 | * | 9/2004 | Yoshiki | G03G 15/0817 399/103 |
| 2012/0098208 A1 | * | 4/2012 | Yamamoto | F16C 41/007 277/549 |
| 2016/0195846 A1 | * | 7/2016 | Koshizuka | G03G 21/20 399/94 |
| 2016/0319860 A1 | * | 11/2016 | Kitajima | F16C 19/166 |

FOREIGN PATENT DOCUMENTS

| | | |
|---|---|---|
| JP | 2003-130068 A | 5/2003 |
| JP | 2009-204142 A | 9/2009 |
| JP | 2009197820 A * | 9/2009 |

* cited by examiner

*Primary Examiner* — Erika J Villaluna
(74) *Attorney, Agent, or Firm* — Sughrue Mion, PLLC

(57) ABSTRACT

A toner transporting device includes a bearing, an opposing section, a flange, and an engaging section. The bearing has an inner ring supporting a shaft, rolling elements disposed on an outer periphery of the inner ring, and an outer ring disposed around the rolling elements to surround the inner ring. The opposing section is disposed facing a first side of the inner and outer rings. The flange is provided at a second edge at a second side of the outer ring, extends in a direction of the shaft, and covers at least a part of a second end surface at the second side of the inner ring. The engaging section serves as a first edge at the first side of the outer ring, extends out relative to a first end surface at the first side of the inner ring, and engages with the opposing section in a relatively movable manner.

14 Claims, 8 Drawing Sheets

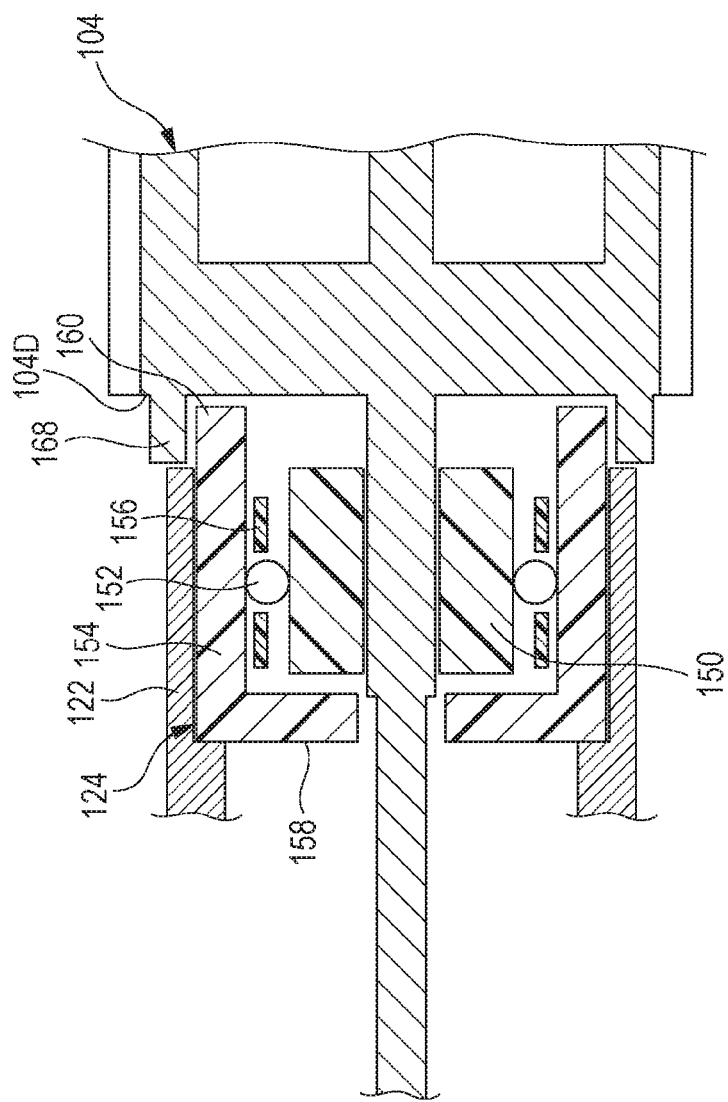

TONER TRANSPORTING DEVICE, DEVELOPING DEVICE, AND IMAGE FORMING APPARATUS

CROSS-REFERENCE TO RELATED APPLICATIONS

This application is based on and claims priority under 35 USC 119 from Japanese Patent Application No. 2018-176505 filed Sep. 20, 2018.

BACKGROUND

(i) Technical Field

The present disclosure relates to toner transporting devices, developing devices, and image forming apparatuses.

(ii) Related Art

With regard to a bearing disclosed in Japanese Unexamined Patent Application Publication No. 2003-130068, one end of an adiabatic sleeve fitted within an inner surface of an inner ring is provided with an outward flange, and a surface facing a bearing end surface of the flange is provided with an annular protrusion. This protrusion is inserted into a gap between the inner ring and an outer ring so as to block one end of the gap. Thus, improved sealing performance is achieved in accordance with a labyrinth seal effect obtained between the protrusion and the outer ring, and one shield plate incorporated in the bearing is not necessary.

In a bearing disclosed in Japanese Unexamined Patent Application Publication No. 2009-204142, an outer-ring shield plate is fixed to an outer ring of the bearing in a noncontact state with an inner ring, and an inner-ring shield plate is fixed to the inner ring in a noncontact state with the outer ring. The outer-ring shield plate and the inner-ring shield plate are disposed facing each other at the inner side and the outer side, respectively, thereby forming a labyrinth gap between the shield plates. The distal end of each shield plate is bent toward the other shield plate, so that the port opening of the labyrinth gap is reduced in width.

SUMMARY

Aspects of non-limiting embodiments of the present disclosure relate to a toner transporting device, a developing device, and an image forming apparatus that may suppress penetration of toner into a bearing, as compared with a case where a gap between an inner ring and an outer ring are exposed to the outside.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a toner transporting device including a bearing, an opposing section, a flange, and an engaging section. The bearing has an inner ring that supports a shaft, multiple rolling elements disposed on an outer periphery of the inner ring, and an outer ring disposed around the rolling elements so as to surround the inner ring. The opposing section is disposed facing a first side of the inner ring and the outer ring. The flange is provided at a second edge at a second side of the outer ring, extends in a direction of the shaft, and covers at least a part of a second end surface at the second side of the inner ring. The engaging section serves as a first edge at the first side of the outer ring, extends out relative to a first end surface at the first side of the inner ring, and engages with the opposing section in a relatively movable manner.

BRIEF DESCRIPTION OF THE DRAWINGS

Exemplary embodiments of the present disclosure will be described in detail based on the following figures, wherein:

FIG. 8 is a cross-sectional view of a relevant part, illustrating a state where a shaft from a gear is supported by a bearing, in accordance with a third exemplary embodiment.

DETAILED DESCRIPTION

First Exemplary Embodiment

An example of an image forming apparatus equipped with a toner transporting device according to a first exemplary embodiment will now be described with reference to FIGS. 1 to 5. An arrow H shown in FIG. 1 indicates the vertical direction of the apparatus, an arrow W indicates the width direction (i.e., horizontal direction) of the apparatus, and an arrow D indicates the depth direction (i.e., horizontal direction) of the apparatus.

Overall Configuration of Image Forming Apparatus

Figure 1:
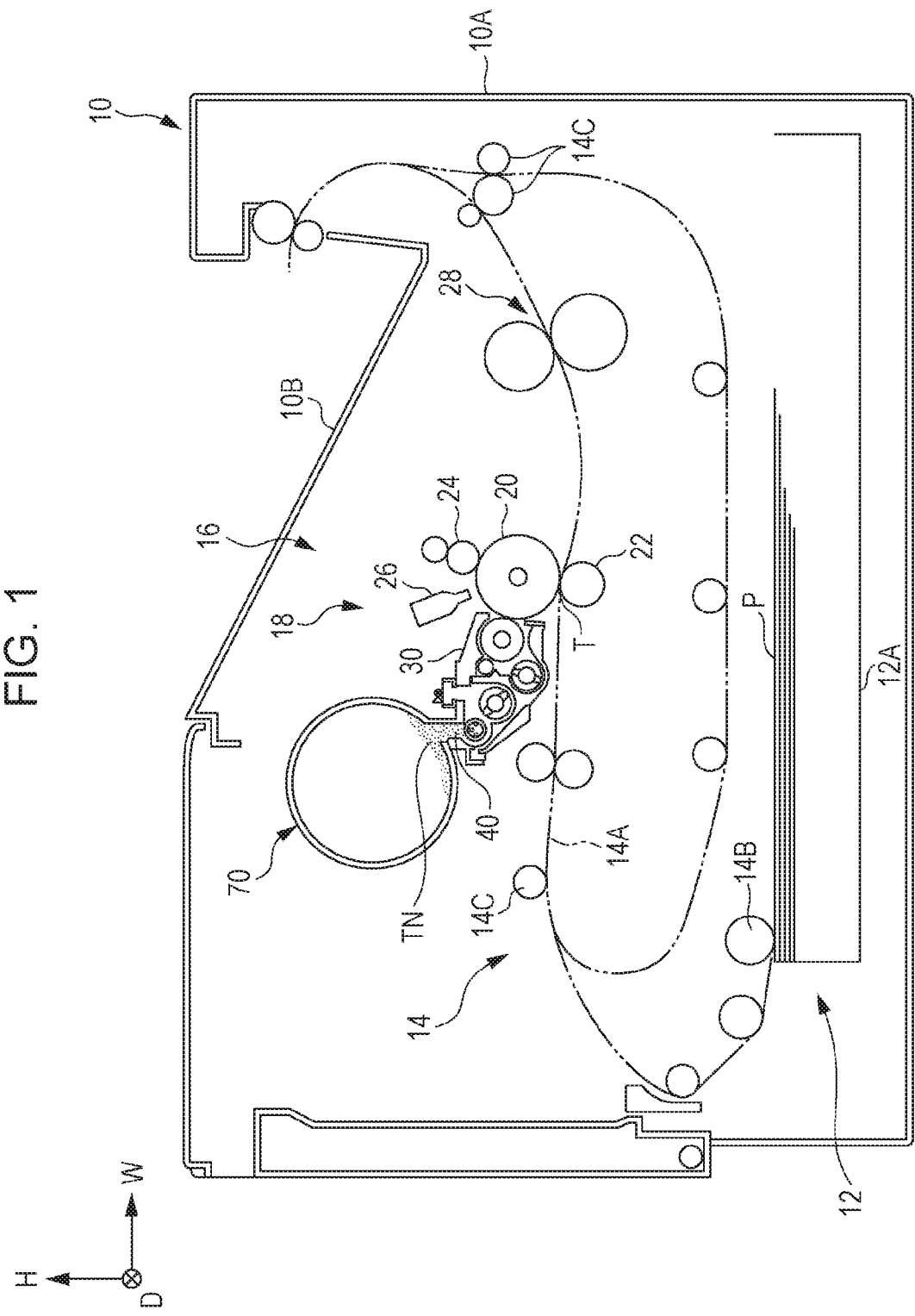
FIG. 1 schematically illustrates an image forming apparatus according to a first exemplary embodiment.

As shown in FIG. 1, an image forming apparatus 10 according to this exemplary embodiment is provided with a sheet container 12 containing one or more sheets P, a transporting section 14 that transports a sheet P, and an image forming section 16 that forms an image onto the sheet P in that order from the lower side toward the upper side.

Sheet Container

The sheet container 12 includes a container member 12A that is withdrawable toward the front from a housing 10A of the image forming apparatus 10 in the depth direction of the apparatus, and one or more sheets P are stacked on this container member 12A. Moreover, the sheet container 12 includes a feed roller 14B that feeds each sheet P stacked on the container member 12A toward a transport path 14A constituting the transporting section 14.

Transporting Section

The transporting section 14 includes multiple transport rollers 14C that transport the sheet P fed by the feed roller 14B of the sheet container 12 to the image forming section 16 and a sheet output section 10B in that order along the transport path 14A.

Image Forming Section

The image forming section 16 includes an image forming unit 18 as an example of an image forming section that forms a black toner image.

The image forming unit 18 includes a charging roller 24 that receives voltage, and also includes a photoconductor drum 20 whose surface is electrostatically charged to a negative potential by the charging roller 24. The image forming unit 18 further includes an exposure unit 26 that forms an electrostatic latent image by radiating exposure light onto the surface of the photoconductor drum 20 electrostatically charged based on input data, and a developing device 30 that develops the electrostatic latent image formed on the photoconductor drum 20 into a visible toner image.

Moreover, the image forming section 16 includes a transfer roller 22 that nips the sheet P transported along the transport path 14A together with the photoconductor drum 20 at a transfer position T so as to transfer the toner image on the photoconductor drum 20 onto the sheet P, and also includes a fixing device 28 that fixes the toner image transferred on the sheet P onto the sheet P by using heat and pressure.

Configuration of Developing Device

Figure 2:
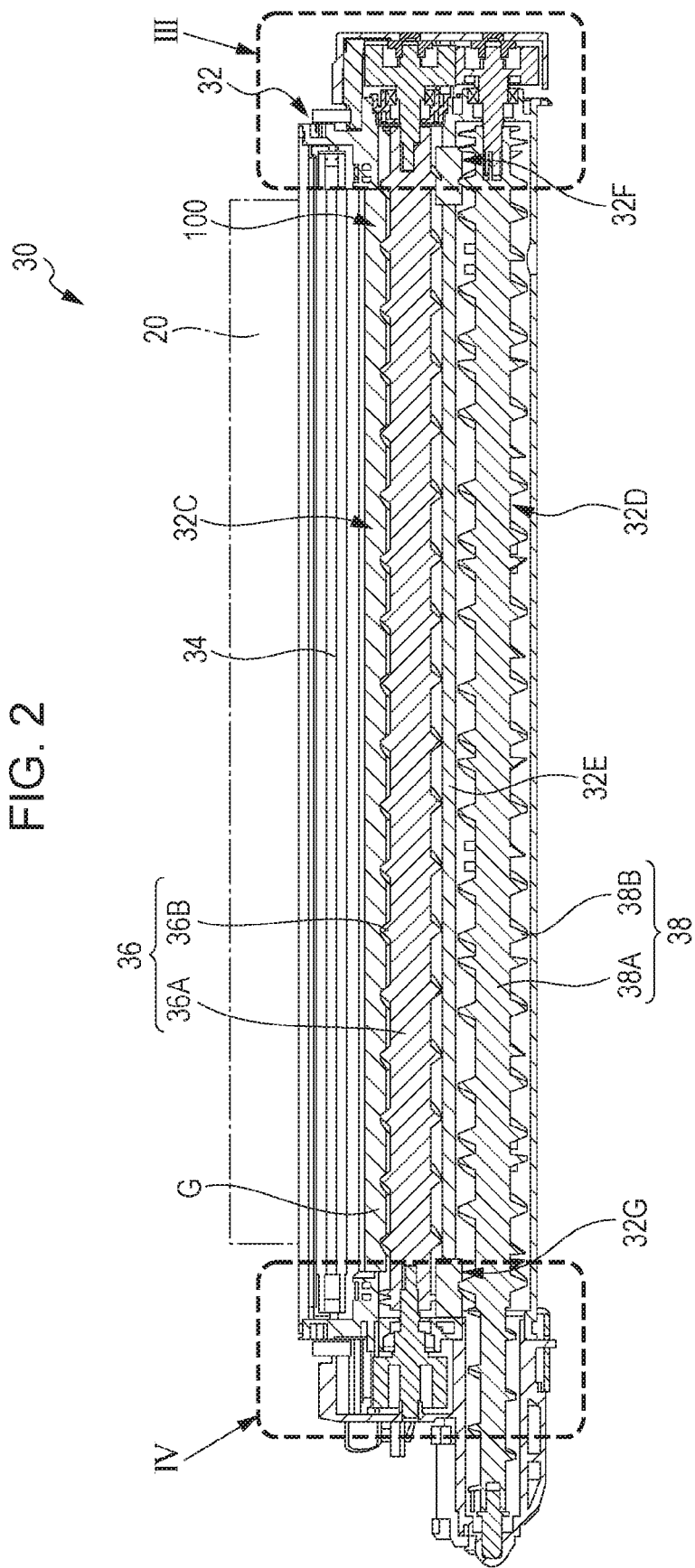
FIG. 2 is a cross-sectional view illustrating a developing device equipped with a toner transporting device according to the first exemplary embodiment.
Figure 3:
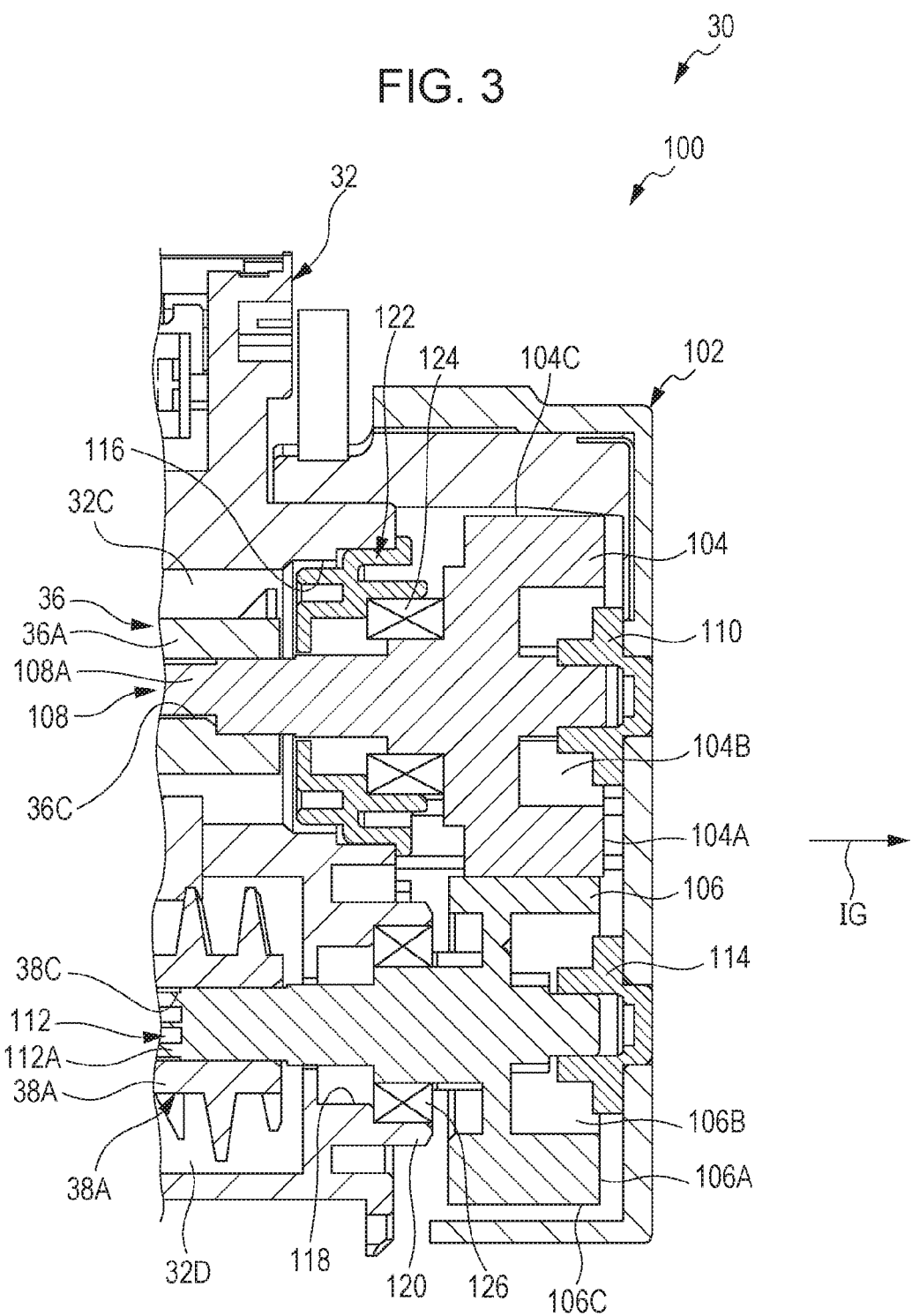
FIG. 3 is an enlarged view of an area III in FIG. 2.
Figure 4:
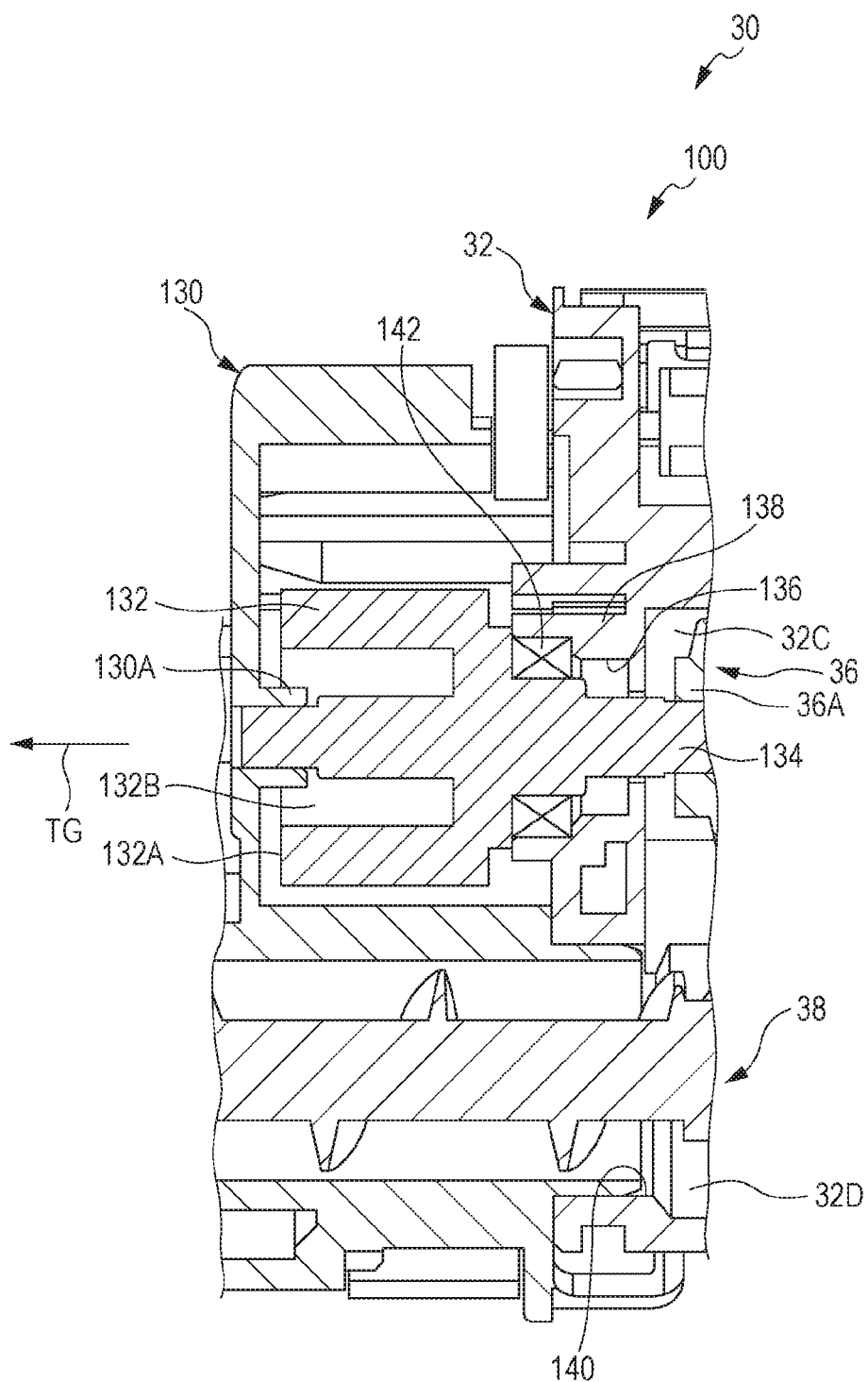
FIG. 4 is an enlarged view of an area IV in FIG. 2.

As shown in FIGS. 2 to 4, the developing device 30 includes a toner transporting device 100.

The developing device 30 includes a housing 32, a developing roller 34 that develops the electrostatic latent image on the photoconductor drum 20 into a toner image, a feed auger 36 that feeds a developer G to the developing roller 34, and an agitation auger 38 that agitates the developer G. The developer G is a two-component developer having a toner TN and a magnetic carrier as principal components.

Housing

The housing 32 of the developing device 30 has a feed section 32C where the feed auger 36 is disposed and an agitation section 32D where the agitation auger 38 is disposed, and includes a partition 32E between the feed section 32C and the agitation section 32D.

The partition 32E has an opening at the right end in FIG. 2, and this opening forms a downstream communication path 32F that allows the developer G agitated in the agitation section 32D to travel toward the feed section 32C.

Furthermore, the partition 32E has an opening at the right end in FIG. 2, and this opening forms an upstream communication path 32G that allows the developer G from the feed section 32C to return to the agitation section 32D.

Feed Auger

The feed auger 36 includes a feed shaft 36A and a helical feed blade 36B formed on the outer peripheral surface of the feed shaft 36A. The feed shaft 36A is rotatably supported by the housing 32, and the feed shaft 36A is rotationally driven.

The feed auger 36 uses the feed blade 36B to agitate the developer G delivered from the downstream communication path 32F to the feed section 32C while transporting the developer G from the upstream side (i.e., right side in FIG. 2) toward the downstream side (i.e., left side in FIG. 2), and feeds the toner TN electrostatically charged by friction during the agitation process to the developing roller 34. Moreover, the feed auger 36 delivers the developer G transported downstream (i.e., leftward in FIG. 2) to the agitation auger 38 of the agitation section 32D via the upstream communication path 32G.

Agitation Auger

The agitation auger 38 includes an agitation shaft 38A and a helical agitation blade 38B formed on the outer peripheral surface of the agitation shaft 38A. The agitation shaft 38A is rotatably supported by the housing 32, and the agitation shaft 38A is rotationally driven.

The agitation auger 38 uses the agitation blade 38B to agitate a toner TN newly supplied from a toner resupply section 70 (see FIG. 1) with the developer G delivered via the upstream communication path 32G while transporting them downstream (rightward in FIG. 2). Consequently, the developer G circulates between the agitation section 32D and the feed section 32C.

FIG. 3 is an enlarged view of an area III in FIG. 2 and illustrates a first end of the housing 32 of the developing device 30. The first end of the housing 32 is provided with a first-end gear casing 102. The first-end gear casing 102 accommodates therein a feed gear 104 that rotates together with the feed auger 36 and an agitation gear 106 for rotating the agitation auger 38.

The feed gear 104 integrally has a feed shaft 108. A first end of the feed shaft 108 extending toward a first side IG is rotatably supported by a stationary bearing 110 provided in the first-end gear casing 102. A first end surface 104A of the feed gear 104 is provided with a recess 104B that surrounds the feed shaft 108, thereby achieving weight reduction.

The agitation gear 106 integrally has an agitation shaft 112. A first end of the agitation shaft 112 extending toward the first side IG is rotatably supported by a stationary bearing 114 provided in the first-end gear casing 102. A first end surface 106A of the agitation gear 106 is provided with a recess 106B that surrounds the agitation shaft 112, thereby achieving weight reduction.

The feed gear 104 and the agitation gear 106 are disposed such that a peripheral gear section 104C of the feed gear 104 and a peripheral gear section 106C of the agitation gear 106 mesh with each other, and the agitation gear 106 rotates in accordance with the rotation of the feed gear 104.

The first end of the housing 32 is provided with a cylindrical section 120 having a cap fit hole 116 that communicates with the feed section 32C and also having a through-hole 118 that communicates with the agitation section 32D. A bearing cap 122 is fitted to the cap fit hole 116. The feed shaft 108 extending out from the feed gear 104 is rotatably supported within the bearing cap 122 via a bearing 124. A D-shaped section 108A having a D-shape in cross section and provided at the distal end of the feed shaft 108 is fitted to a D-shaped hole 36C formed in an end surface of the feed shaft 36A of the feed auger 36.

The agitation shaft 112 extending out from the agitation gear 106 is rotatably supported within the cylindrical section 120 via a bearing 126. A D-shaped section 112A having a D-shape in cross section and provided at the distal end of the agitation shaft 112 is fitted to a D-shaped hole 38C formed in an end surface of the agitation shaft 38A of the agitation auger 38.

FIG. 4 is an enlarged view of an area IV in FIG. 2 and illustrates a second end of the housing 32 of the developing device 30. The second end of the housing 32 is provided with a second-end gear casing 130. The second-end gear casing 130 accommodates therein a drive gear 132 for rotationally driving the feed auger 36.

The drive gear 132 integrally has a drive shaft 134. A second end of the drive shaft 134 extending toward a second side TG is rotatably supported by a tubular bearing 130A integrated with the second-end gear casing 130. A second end surface 132A of the drive gear 132 is provided with a recess 132B that surrounds the drive shaft 134, thereby achieving weight reduction. The drive gear 132 rotates by receiving a rotational force from a drive source (not shown).

The second end of the housing 32 is provided with a second-end cylindrical section 138 having a through-hole 136 communicating with the feed section 32C, and is also provided with an opening 140 communicating with the agitation section 32D. A second end of the agitation auger 38 extends outward from the opening 140 and is rotatably supported by a wall surface of the housing 32.

Furthermore, the drive shaft 134 extending out from the drive gear 132 is rotatably supported within the second-end cylindrical section 138 via a bearing 142, and the distal end of the drive shaft 134 is fitted in a state where it is prevented from rotating by an end surface of the feed shaft 36A of the feed auger feed auger 36.

Figure 5:
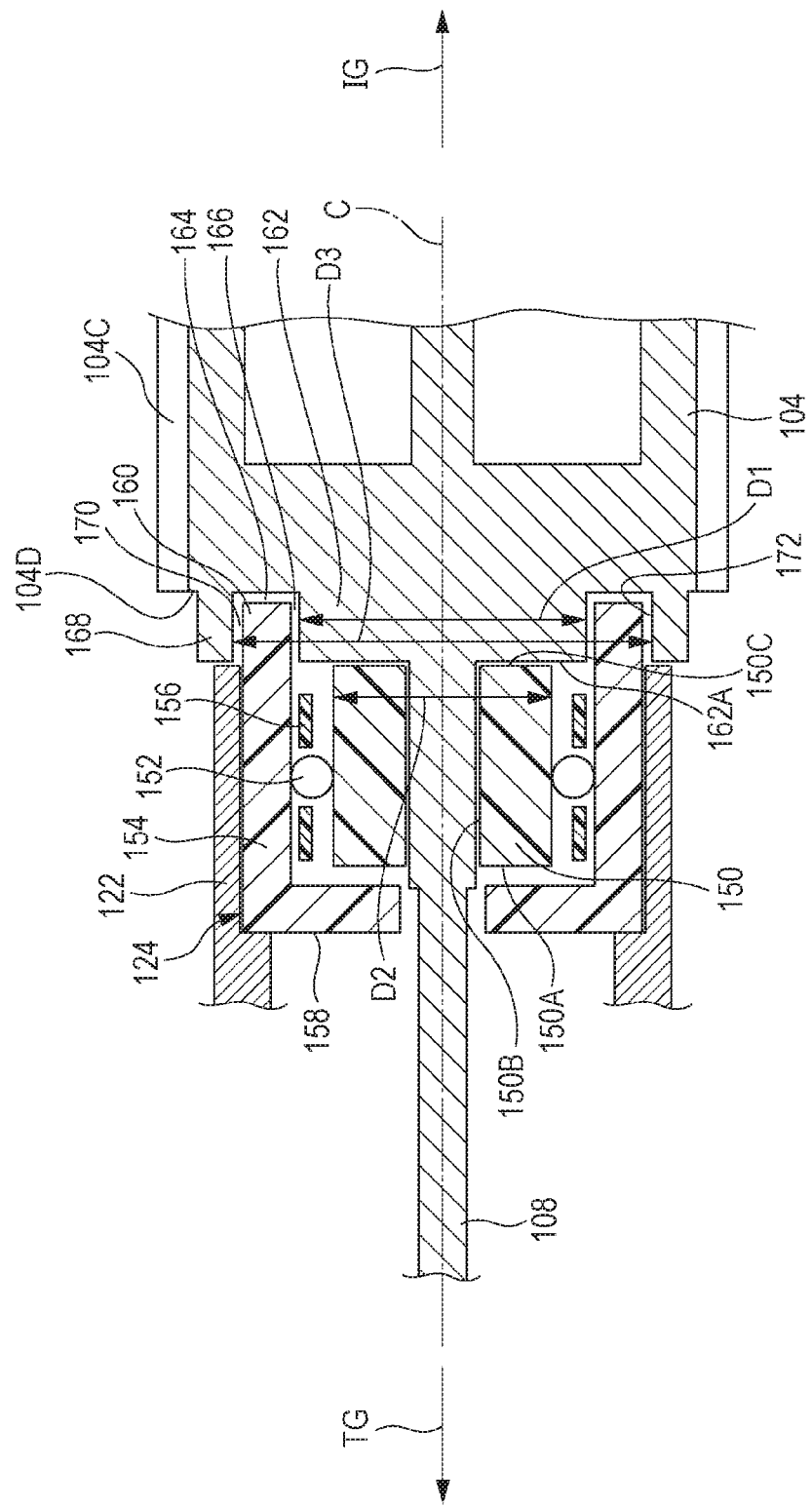
FIG. 5 is a cross-sectional view of a relevant part, illustrating a state where a shaft from a gear is supported by a bearing, in accordance with the first exemplary embodiment.

FIG. 5 is a simplified enlarged view of a support structure in which the feed shaft 108 of the feed gear 104 is supported by the bearing 124.

The bearing 124 includes a cylindrical inner ring 150 that supports the feed shaft 108 extending therethrough, multiple rolling elements 152 disposed on the outer periphery of the inner ring 150, and an outer ring 154 disposed around the rolling elements 152 so as to surround the inner ring 150. At the first side IG of the bearing 124 (i.e., the outer side of the housing 32 in the axial direction) is disposed the feed gear 104 that rotates together with the feed shaft 108. The feed gear 104 serves as an example of an opposing section that faces the first side IG of the bearing 124 and that entirely covers the radial direction of the bearing 124.

The rolling elements 152 are spherical balls. The bearing 124 may also be referred to as a ball bearing. The rolling elements 152 are rotatably retained by a retainer 156, and the distance between neighboring rolling elements 152 is maintained at a predetermined value.

Although a ball bearing using balls as the rolling elements 152 is described as an example in this exemplary embodiment, the bearing is not limited to this. For example, the bearing may be a roller bearing using rollers as the rolling elements 152.

The outer ring 154 has a cylindrical shape with a diameter larger than that of the inner ring 150. A second edge of the outer ring 154 at the second side TG is integrally provided with a flange 158 that extends toward the feed shaft 108 and that covers at least a part of an inner-ring second end surface 150A of the inner ring 150.

In other words, the flange 158 extends out toward a rotation axis C of the bearing 124 from the second edge of the outer ring 154.

Accordingly, at the second end of the bearing 124, the gap between the inner ring 150 and the outer ring 154 is covered by the flange 158, and the flange 158 is set to a length that prevents it from coming into contact with the inner ring 150 or the feed shaft 108 extending through a through-hole 150B in the inner ring 150.

A first edge of the outer ring 154 serves as an engaging section 160 that extends out relative to an inner-ring first end surface 150C of the inner ring 150 and that engages with the feed gear 104 serving as the opposing section in a relatively movable manner.

In other words, a part of the outer ring 154 that extends out toward the first side IG relative to the inner-ring first end surface 150C of the inner ring 150 serves as the engaging section 160.

A second end surface 104D of the feed gear 104 is integrally provided with a columnar protrusion 162 at the shaft around the rotation axis C. The feed shaft 108 extends out from a protrusion end surface 162A of the protrusion 162. The protrusion end surface 162A abuts on the inner-ring first end surface 150C of the inner ring 150 of the bearing 124, so that the bearing 124 is positioned relative to the feed gear 104 in the axial direction. Consequently, a first gap 164 is formed between the distal end of the engaging section 160 of the outer ring 154 and the second end surface 104D of the feed gear 104.

The first gap 164 has a lower limit value set therefor in view of assembly accuracy and component dimensional accuracy. For example, the first gap 164 in this exemplary embodiment is set to a dimension of 0.5 mm.

The engaging section 160 in the outer ring 154 of the bearing 124 engages with the feed gear 104 serving as the opposing section so as to surround the outer periphery of the protrusion 162 provided therein. In this engaged state, an outer diameter D1 of the protrusion 162 is set such that a second gap 166 is formed between the inner peripheral surface of the engaging section 160 and the outer peripheral surface of the protrusion 162.

The second gap 166 has a lower limit value set therefor in view of assembly accuracy and component dimensional accuracy. For example, the second gap 166 in this exemplary embodiment is set to a dimension of 0.5 mm.

The outer diameter D1 of the protrusion 162 is set to be larger than an outer diameter D2 of the inner ring 150 of the bearing 124, so that the second gap 166 between the engaging section 160 and the protrusion 162 is smaller than in a case where the protrusion 162 and the inner ring 150 have the same dimension.

The second end surface 104D of the feed gear 104 is integrally provided with an annular projection 168 surrounding the protrusion 162. The engaging section 160 in the outer ring 154 of the bearing 124 engages within the projection 168 provided on the second end surface 104D of the feed gear 104. In this engaged state, an inner diameter D3 of the projection 168 is set such that a third gap 170 is formed between the outer peripheral surface of the engaging section 160 and the inner peripheral surface of the projection 168.

The third gap 170 has a lower limit value set therefor in view of assembly accuracy and component dimensional accuracy. For example, the third gap 170 in this exemplary embodiment is set to a dimension of 0.5 mm.

A ring groove 172 in which the engaging section 160 is disposed is formed between the protrusion 162 and the projection 168. The ring groove 172 has a width that is larger than the thickness of the engaging section 160.

Accordingly, relative movement between the engaging section 160 and the feed gear 104 in the axial direction and the rotational direction is allowed.

The rolling elements 152 of the bearing 124 are composed of metal, specifically, stainless steel (SUS). The inner ring 150, the outer ring 154, and the retainer 156 of the bearing 124 are composed of synthetic resin, specifically, polyacetal resin (POM).

Operation

The operation according to this exemplary embodiment having the above configuration will now be described.

With regard to the bearing 124 that supports the feed shaft 108 of the feed gear 104, the engaging section 160 serving as the first edge of the outer ring 154 extends out relative to the inner-ring first end surface 150C of the inner ring 150 and engages with the feed gear 104 as an example of the opposing section in a relatively movable manner.

Therefore, penetration of the toner TN into the bearing 124 may be suppressed, as compared with a case where the gap between the inner ring 150 and the outer ring 154 is exposed to the outside.

Furthermore, by suppressing toner penetration into the bearing 124 caused by, for example, a toner cloud, the durability of the bearing 124 may be improved.

Furthermore, the engaging section 160 of the outer ring 154 of the bearing 124 engages with the feed gear 104 serving as the opposing section so as to surround the outer periphery of the protrusion 162 formed on the second end surface 104D of the feed gear 104. Consequently, the gap communicating with the interior of the bearing 124 from outside the bearing 124 extends along the inner peripheral surface of the engaging section 160.

The outer diameter D1 of the protrusion 162 is larger than the outer diameter D2 of the inner ring 150. Therefore, the second gap 166 between the protrusion 162 and the engaging section 160 is smaller than in a case where the outer diameter D1 of the protrusion 162 is smaller than or equal to the outer diameter D2 of the inner ring 150.

Furthermore, the engaging section 160 engages within the annular projection 168 provided on the second end surface 104D of the feed gear 104 serving as the opposing section. Therefore, the path communicating with the interior of the bearing 124 from outside the bearing 124 extends along the outer peripheral surface of the engaging section 160.

The inner ring 150 and the outer ring 154 of the bearing 124 are composed of synthetic resin. Therefore, cost reduction may be achieved, as compared with a case where the inner ring 150 and the outer ring 154 are composed of metal.

Moreover, the feed gear 104 serving as the opposing section rotates together with the feed shaft 108 extending through the inner ring 150 of the bearing 124. Therefore, compactness may be achieved, as compared with a case where a dedicated opposing section is provided.

Comparative Example

Figure 6:
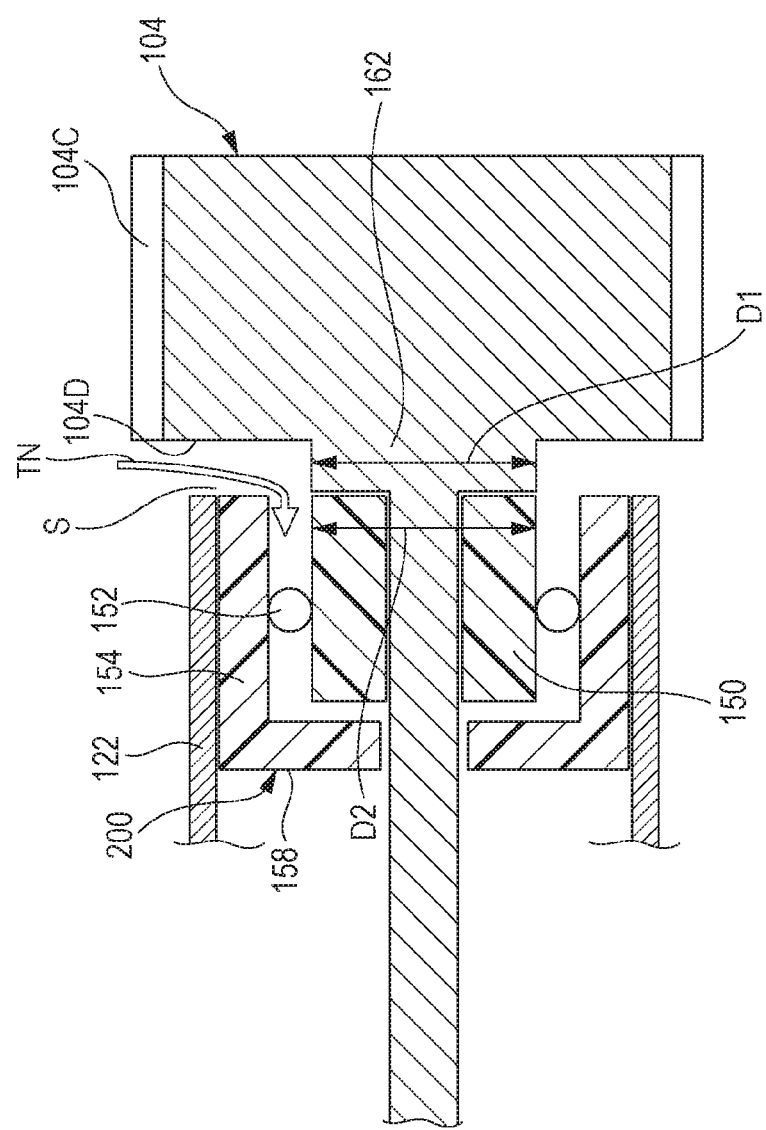
FIG. 6 is a cross-sectional view of a relevant part, illustrating a comparative example corresponding to FIG. 5.

FIG. 6 illustrates a comparative example. Components identical or similar to those in the first exemplary embodiment will be given the same reference signs, and descriptions thereof will be omitted. The following description relates only to components different from those in the first exemplary embodiment.

Specifically, a bearing 200 according to this comparative example has the flange 158 at the second edge of the outer ring 154, but the first edge of the outer ring 154 does not extend out relative to the inner-ring first end surface 150C of the inner ring 150. Moreover, the outer diameter D1 of the protrusion 162 formed on the second end surface 104D of the feed gear 104 is substantially equal to the outer diameter D2 of the inner ring 150.

In this comparative example, a gap S (having substantially the same dimension as the first gap 164 in the first exemplary embodiment) between the inner ring 150 and the outer ring 154 is exposed to the outside. The toner TN tends to penetrate easily between the inner ring 150 and the outer ring 154 of the bearing 200 through this exposed gap S.

In contrast, as shown in FIG. 5, in this exemplary embodiment, the engaging section 160 serving as the first edge of the outer ring 154 extends out relative to the inner-ring first end surface 150C of the inner ring 150 and engages with the feed gear 104 in a relatively movable manner. Therefore, as compared with the comparative example, penetration of the toner TN into the bearing 124 may be suppressed by the gap having a winding labyrinth-like structure that is long and narrow.

Furthermore, in this exemplary embodiment, the third gap 170 is provided between the outer peripheral surface of the engaging section 160 of the outer ring 154 and the inner peripheral surface of the projection 168, and the first gap 164 is provided between the distal end of the engaging section 160 and the second end surface 104D of the feed gear 104. Moreover, the second gap 166 is provided between the inner peripheral surface of the engaging section 160 and the outer peripheral surface of the protrusion 162, and the third gap 170 to the second gap 166 form a cranked path that connects the interior and the exterior of the bearing 124.

Therefore, the penetration path of the toner TN toward the bearing 124 is extended, so that penetration of the toner TN into the bearing 124 may be suppressed, as compared with the comparative example having the linear gap S connecting the interior and the exterior of the bearing 124.

In this exemplary embodiment, the outer diameter D1 of the protrusion 162 is larger than the outer diameter D2 of the inner ring 150 of the bearing 124, and the second gap 166 between the engaging section 160 and the protrusion 162 is smaller than that in the comparative example. This may also suppress penetration of the toner TN into the bearing 124.

Second Exemplary Embodiment

Figure 7:
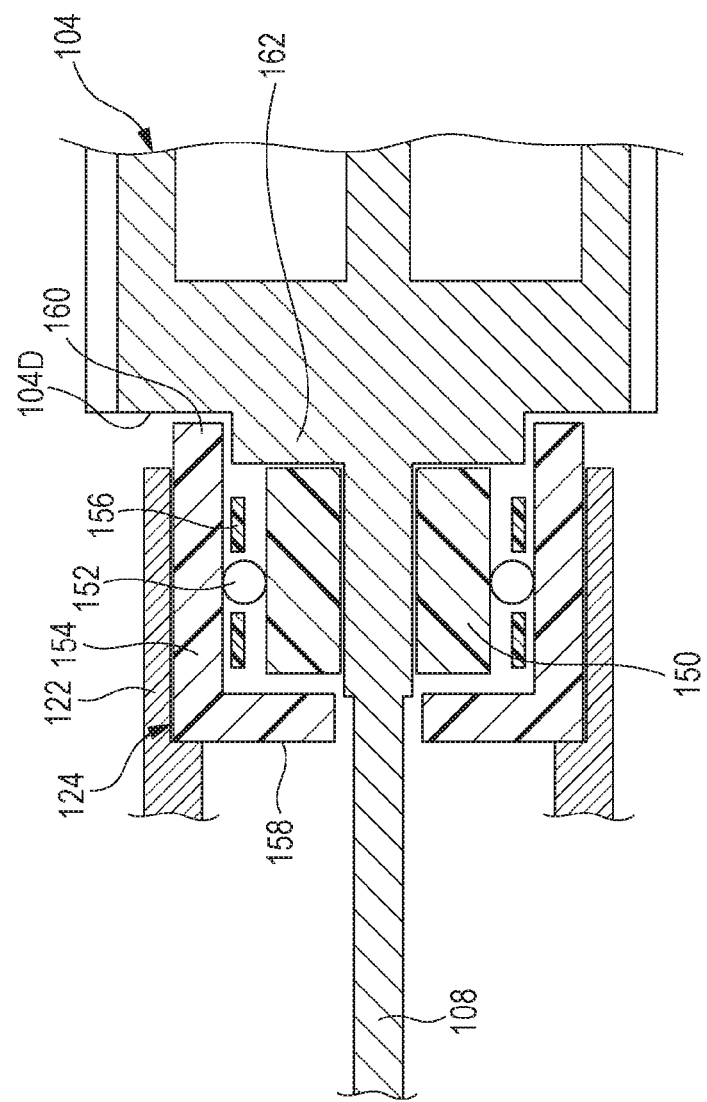
FIG. 7 is a cross-sectional view of a relevant part, illustrating a state where a shaft from a gear is supported by a bearing, in accordance with a second exemplary embodiment.

FIG. 7 illustrates a second exemplary embodiment. Components identical or similar to those in the first exemplary embodiment will be given the same reference signs, and descriptions thereof will be omitted. The following description relates only to components different from those in the first exemplary embodiment. FIG. 7 is a simplified enlarged view of a support structure in which the feed shaft 108 of the feed gear 104 is supported by the bearing 124.

Specifically, in this exemplary embodiment, the annular projection 168 provided on the second end surface 104D of the feed gear 104 serving as the opposing section has been removed, as compared with the first exemplary embodiment.

With such a structure, the path communicating with the interior of the bearing 124 from outside the bearing 124 extends along the inner peripheral surface of the engaging section 160, so that penetration of the toner TN into the bearing 124 may be suppressed, as compared with a case where the gap between the inner ring 150 and the outer ring 154 is exposed to the outside.

Third Exemplary Embodiment

FIG. 8 illustrates a third exemplary embodiment. Components identical or similar to those in the first exemplary embodiment will be given the same reference signs, and descriptions thereof will be omitted. The following description relates only to components different from those in the first exemplary embodiment. FIG. 8 is a simplified enlarged view of a support structure in which the feed shaft 108 of the feed gear 104 is supported by the bearing 124.

Specifically, in this exemplary embodiment, the protrusion 162 provided on the second end surface 104D of the feed gear 104 serving as the opposing section has been removed, as compared with the first exemplary embodiment.

With such a structure, the path communicating with the interior of the bearing 124 from outside the bearing 124 extends along the outer peripheral surface of the engaging section 160, so that penetration of the toner TN into the bearing 124 may be suppressed, as compared with a case where the gap between the inner ring 150 and the outer ring 154 is exposed to the outside.

As an alternative to each of the exemplary embodiments in which the opposing section disposed facing the bearing 124 is constituted of the feed gear 104, for example, the opposing section disposed facing the bearing 124 may be constituted of a wall surface of the housing 32.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A toner transporting device comprising:
a bearing having an inner ring that supports a shaft, a plurality of rolling elements disposed on an outer periphery of the inner ring, and an outer ring disposed around the rolling elements so as to surround the inner ring;
an opposing section disposed facing a first side of the inner ring and the outer ring and configured such that the first side of the inner ring is adjacent the opposing section;
a flange that is provided at a second edge at a second side of the outer ring, extends in a radial direction of the shaft, and covers at least a part of a second end surface at a second side of the inner ring; and
an engaging section that serves as a first edge at the first side of the outer ring, extends out in an axial direction beyond a first end surface at the first side of the inner ring, and engages with the opposing section in a relatively movable manner,
wherein the engaging section engages within an annular projection provided in the opposing section.

2. The toner transporting device according to claim 1,
wherein the engaging section engages with the opposing section so as to surround an outer periphery of a protrusion provided in the opposing section.

3. The toner transporting device according to claim 2,
wherein the protrusion has an outer diameter that is larger than an outer diameter of the inner ring.

4. The toner transporting device according to claim 3,
wherein the inner ring and the outer ring of the bearing are composed of synthetic resin.

5. The toner transporting device according to claim 2,
wherein the inner ring and the outer ring of the bearing are composed of synthetic resin.

6. The toner transporting device according to claim 1,
wherein a protrusion disposed within the engaging section is provided in the opposing section.

7. The toner transporting device according to claim 6,
wherein the inner ring and the outer ring of the bearing are composed of synthetic resin.

8. The toner transporting device according to claim 1,
wherein the inner ring and the outer ring of the bearing are composed of synthetic resin.

9. The toner transporting device according to claim 1,
wherein the inner ring and the outer ring of the bearing are composed of synthetic resin.

10. The toner transporting device according to claim 1,
wherein the opposing section is a gear that rotates together with the shaft.

11. A developing device comprising:
the toner transporting device according to claim 1; and
a developing roller that is supplied with toner transported by the toner transporting device.

12. An image forming apparatus comprising:
the developing device according to claim 11; and
a photoconductor drum on which a toner image is formed by using toner supplied from the developing roller of the developing device.

13. A toner transporting device comprising:
a bearing having an inner ring that supports a shaft, a plurality of rolling elements disposed on an outer periphery of the inner ring, and an outer ring disposed around the rolling elements so as to surround the inner ring;
an opposing section disposed facing a first side of the inner ring and the outer ring;
a flange that is provided at a second edge at a second side of the outer ring, extends in a radial direction of the shaft, and covers at least a part of a second end surface at a second side of the inner ring; and
an engaging section that serves as a first edge at the first side of the outer ring, extends out in an axial direction beyond a first end surface at the first side of the inner ring, and engages with the opposing section in a relatively movable manner,
wherein the engaging section engages with the opposing section so as to surround an outer periphery of a protrusion provided in the opposing section,
wherein the engaging section engages within an annular projection provided in the opposing section.

14. The toner transporting device according to claim 13,
wherein the protrusion has an outer diameter that is larger than an outer diameter of the inner ring.

* * * * *